United States Patent
Isayeva et al.

(10) Patent No.: US 11,979,363 B2
(45) Date of Patent: May 7, 2024

(54) UNREAD LANDING PAGE

(71) Applicant: Zoom Video Communications, Inc., San Jose, CA (US)

(72) Inventors: Ganna Isayeva, Odessa, FL (US); Youjin Jang, San Ramon, CA (US); Sharvari Nerurkar, Redmond, WA (US); Archil Vardidze, Austin, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/588,743

(22) Filed: Jan. 31, 2022

(65) Prior Publication Data

US 2023/0275854 A1 Aug. 31, 2023

(51) Int. Cl.
*H04L 51/046* (2022.01)
*H04L 12/18* (2006.01)
*H04L 51/224* (2022.01)

(52) U.S. Cl.
CPC ........ *H04L 51/046* (2013.01); *H04L 12/1822* (2013.01); *H04L 51/224* (2022.05)

(58) Field of Classification Search
None
See application file for complete search history.

(56) References Cited

U.S. PATENT DOCUMENTS

| | | | | |
|---|---|---|---|---|
| 5,258,751 A * | 11/1993 | DeLuca | ................. | G08B 5/227 340/7.52 |
| 5,835,084 A * | 11/1998 | Bailey | ................. | G06Q 10/107 715/783 |
| 6,725,228 B1 * | 4/2004 | Clark | ................... | G06Q 10/107 707/999.102 |
| 7,051,286 B1 * | 5/2006 | Stemmer | ................ | G16H 40/63 715/822 |
| 7,734,704 B2 * | 6/2010 | Chen | .................... | G06Q 10/107 434/179 |
| 8,739,071 B2 * | 5/2014 | Klassen | ................ | H04L 51/224 715/752 |
| 9,076,154 B1 * | 7/2015 | Song | ....................... | G06Q 30/02 |
| 9,100,218 B2 * | 8/2015 | Green | ................... | H04L 51/224 |
| 9,913,114 B1 * | 3/2018 | Wu | ........................ | G06T 11/60 |

(Continued)

*Primary Examiner* — Backhean Tiv
(74) *Attorney, Agent, or Firm* — Kilpatrick Townsend & Stockton LLP

(57) ABSTRACT

A system is disclosed, where a non-transitory computer-readable medium including a communications interface and a processor, communicatively coupled to the non-transitory computer-readable medium and the communications interface. The processor may be configured to execute processor executable instructions stored in the non-transitory computer-readable medium. The processor may access one or more chat channels, where the one or more chat channels are established by a chat and video conference provider. The processor may determine that one or more messages, directed to a user via the one or more chat channels, includes one or more unread messages. The processor may generate a notification of the one or more unread messages corresponding to the one or more chat channels. The processor may generate an unread landing page including the one or more unread messages from each of the one or more chat channels.

20 Claims, 8 Drawing Sheets

(56) References Cited

U.S. PATENT DOCUMENTS

| | | | |
|---|---|---|---|
| 10,581,766 B2* | 3/2020 | Pham | G06Q 10/10 |
| 10,623,363 B2* | 4/2020 | Kim | H04L 51/04 |
| 10,666,593 B2* | 5/2020 | Frost | H04L 51/216 |
| 10,817,556 B2* | 10/2020 | Meling | G06Q 10/107 |
| 10,897,432 B2* | 1/2021 | Estrada | H04L 51/046 |
| 11,079,907 B1* | 8/2021 | Cole | G06F 3/04817 |
| 11,166,126 B2* | 11/2021 | Greene | H04L 51/42 |
| 11,429,248 B2* | 8/2022 | Zheng | G06F 3/14 |
| 11,457,107 B2* | 9/2022 | Luo | H04L 51/04 |
| 11,531,646 B2* | 12/2022 | Meling | G06F 3/04817 |
| 2004/0153483 A1* | 8/2004 | Cox | H04L 51/58 |
| 2004/0162877 A1* | 8/2004 | Van Dok | G06F 40/109 |
| | | | 709/204 |
| 2007/0180028 A1* | 8/2007 | Chen | G06Q 10/107 |
| | | | 709/204 |
| 2008/0028026 A1* | 1/2008 | Chen | G06Q 10/107 |
| | | | 709/206 |
| 2012/0246577 A1* | 9/2012 | Klassen | G06F 3/04817 |
| | | | 715/752 |
| 2014/0324984 A1* | 10/2014 | Chang | H04L 51/52 |
| | | | 709/206 |
| 2015/0127755 A1* | 5/2015 | Roh | H04L 51/234 |
| | | | 709/206 |
| 2016/0147387 A1* | 5/2016 | Rahman | G06F 40/258 |
| | | | 715/752 |
| 2017/0317960 A1* | 11/2017 | Sirpal | H04L 51/224 |
| 2018/0124002 A1* | 5/2018 | Baker | H04L 51/04 |
| 2018/0152399 A1* | 5/2018 | Ma | H04W 4/12 |
| 2018/0270183 A1* | 9/2018 | Wei | H04L 51/046 |
| 2018/0278563 A1* | 9/2018 | Frost | H04L 51/52 |
| 2019/0268297 A1* | 8/2019 | Vendrow | H04W 4/12 |
| 2019/0356770 A1* | 11/2019 | Yu | G06F 3/0482 |
| 2019/0362532 A1* | 11/2019 | Gordon | H04L 51/18 |
| 2020/0100165 A1* | 3/2020 | Hosier, Jr. | G06Q 30/0269 |
| 2020/0396191 A1* | 12/2020 | Yang | H04L 51/42 |
| 2021/0011967 A1* | 1/2021 | Rathod | G06F 16/9535 |
| 2021/0360073 A1* | 11/2021 | Rodgers | H04L 67/535 |
| 2022/0053083 A1* | 2/2022 | Wu | H04M 1/72472 |
| 2022/0058693 A1* | 2/2022 | Jang | G06Q 30/0269 |
| 2022/0070013 A1* | 3/2022 | Barzilay | H04L 12/1827 |
| 2022/0182349 A1* | 6/2022 | Khosrowshahi | G06F 3/0481 |
| 2022/0200944 A1* | 6/2022 | Kheyfets | G06F 3/0481 |
| 2022/0417197 A1* | 12/2022 | Kim | H04L 51/224 |
| 2023/0031018 A1* | 2/2023 | Kim | H04L 51/224 |
| 2023/0132663 A1* | 5/2023 | Rhee | G06F 3/0485 |
| | | | 709/206 |
| 2023/0246858 A1* | 8/2023 | Etheridge | H04L 12/1822 |
| | | | 709/204 |
| 2023/0275854 A1* | 8/2023 | Isayeva | H04L 12/1822 |
| | | | 709/206 |

* cited by examiner

UNREAD LANDING PAGE

BACKGROUND

The present application relates generally to chat channels and various functions therein, and more particularly providing an unread landing page for unread messages.

DETAILED DESCRIPTION

Figure 1:
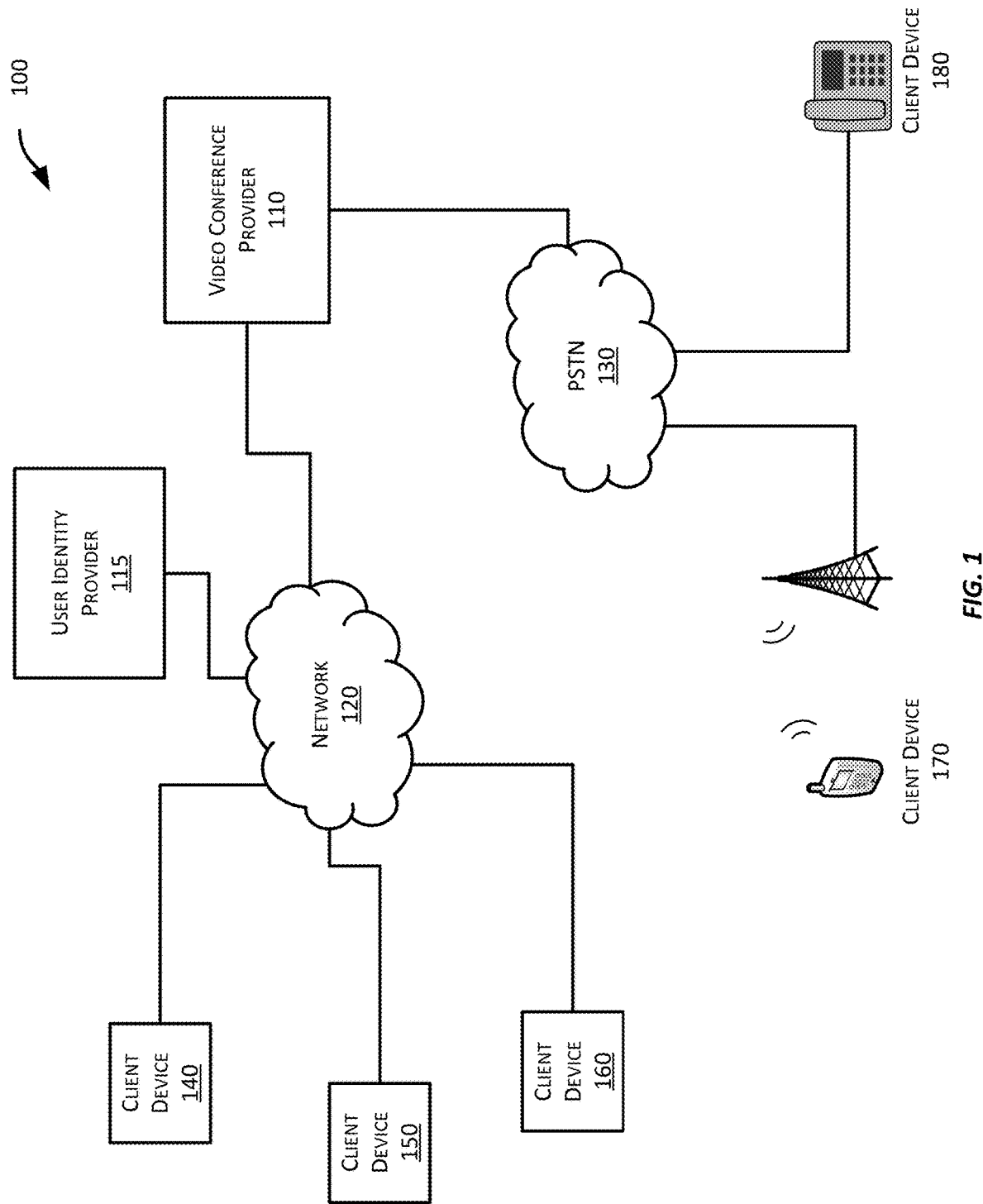
FIG. 1 shows an example system that provides videoconferencing and chat functionality including video messaging to various client devices, according to certain examples.

Examples are described herein in the context of video messaging. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another Platforms capable of allowing participants to send messages between each other continue to grow in popularity. Companies have dedicated platforms that allow participants to send and receive messages, or chat, with other participants to increase productivity and communication, as well as provide for social interaction. Schools and universities may use similar platforms for similar purposes. Some platforms may be used purely socially, or for gaming, or some other purpose; chat platforms proliferate modern interaction.

A chat platform may provide multiple chat channels, which may be displayed on a client device, organized by groups of participants that may access the chat channel using chat client software (or "chat client") by channel name, or by any other organizational scheme. For example, a company may have multiple teams working on different tasks. Each team may have its own associated chat channel. A participant may be a member of multiple chat channels, such as if the participant is a member of multiple teams, for example. While chats can provide quick communication between members of the chat channel, chat platforms may not present all messages in the most efficient way.

For example, a participant who is a member of multiple chat channels may receive one or more messages in multiple chat channels while they are not actively monitoring the chat channels. As a result, they may receive notifications that unread messages are waiting in those channels. The more unread messages that arrive in the different chat channels, the more time it may take the participants to read all of the unread messages, given that the participant may need to go to each chat channel in order to read each individual unread messages. This can be cumbersome for the user.

To alleviate this burden, an example chat system according to this disclosure provides an aggregation section for unread messages, referred to as an "unread landing page." The next time the user accesses their chat client, they may select an option to view the unread landing page, where they may be presented with unread messages from the various channels the user participates in. To further ease the burden on the user, the unread messages may be grouped by channel in the chat client's interface so that the user can quickly scan through the messages without visiting each individual channel, mark messages as read, and post a reply, if they would like to. By providing all unread messages on an unread landing page, aggregated from all the chat channels the participant is a member of, the unread messages may be more efficiently presented. Furthermore, the ability to respond to unread messages from the unread landing page may further increase the efficiency gained by the participant. Systems and methods disclosed herein may allow for providing an unread landing page, and may thereby improve efficiency with a chat platform.

FIG. 1 shows an example system 100 that provides videoconferencing and chat functionality including video messaging to various client devices. The system 100 includes a chat and video conference provider 110 that is connected to multiple communication networks 120, PSTN 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

It should be understood that in example examples, the chat and video conference provider 110 may be a chat provider 110 providing only a chat functionality, while in other example examples, the chat and video conference provider 110 may be a video conference provider 110 providing only video conferencing functionality. Furthermore, although the chat and video conference provider 110 are shown as one entity, other configurations are considered. For example, a chat provider may have a structure similar to that of chat and video conference provider 110, and a video conference provider may also have a structure similar to the chat and video conference provider 110. The chat provider and the video conference provider may be connected through the same network (e.g., the network 120), or may be operable to communicate with each other through another shared network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

In some examples, the chat and video conference provider 110 may provide a chat functionality. In such examples, the chat and video conference provider 110 may allow a user to create one or more chat channels where the user may exchange messages with other users that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 110 may provide permission to a user and/or an owner of the chat channel may provide permission to the user. Furthermore, there may be any number of users permitted in the chat channel.

Figure 2:
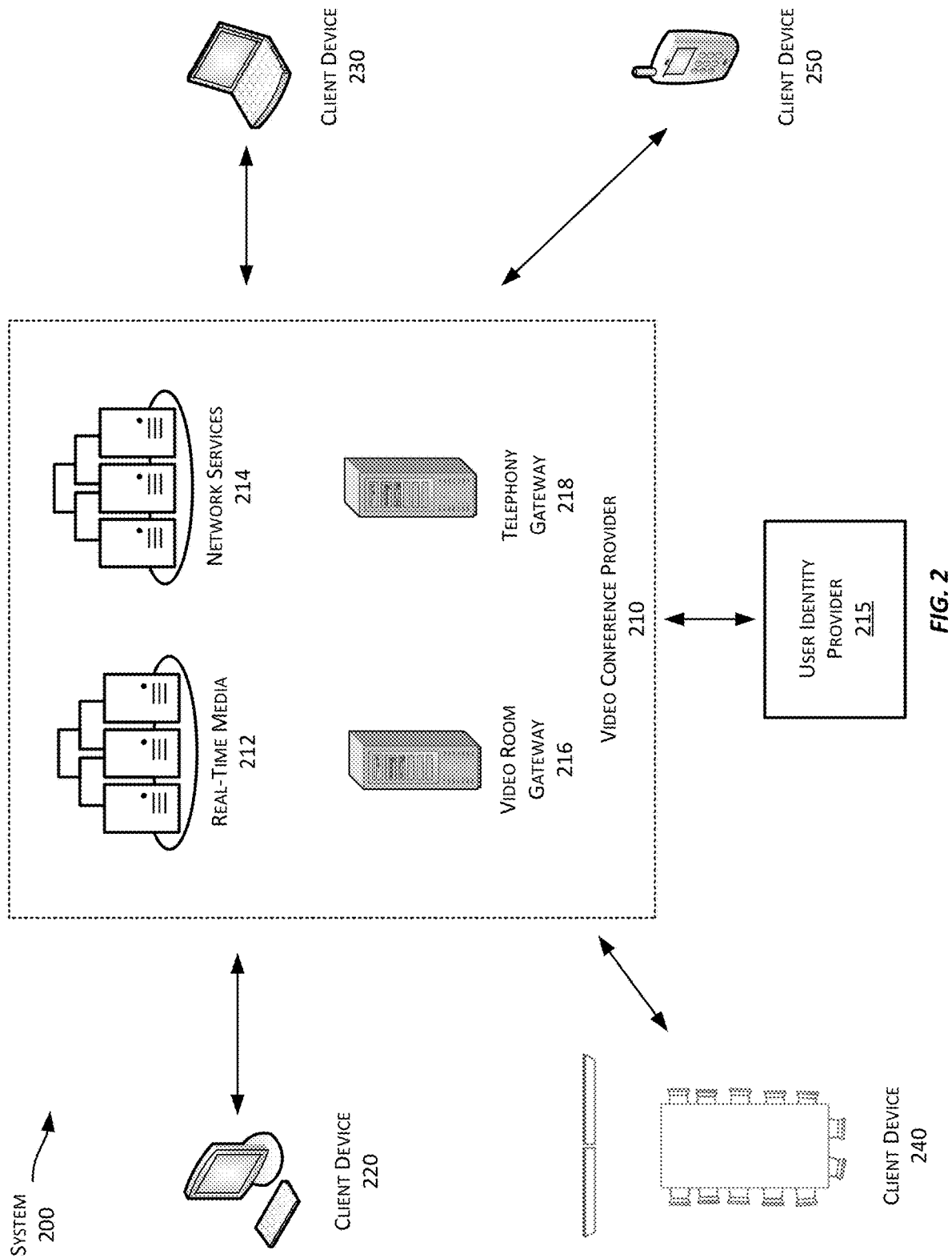
FIG. 2 shows an example system in which a chat and video conference provider provides videoconferencing functionality to various client device, according to certain examples.

The chat and video conference provider 110 may also provide video conferencing functionality. For example, the chat and video conference provider 110 may allow clients to create videoconference meetings (or "meetings") and invite others to participate in those meetings as well as perform other related functionality, such as recording the meetings, generating transcripts from meeting audio, manage user functionality in the meetings, enable text messaging during the meetings, etc. FIG. 2, described below, provides a more detailed description of the architecture and functionality of the chat and video conference provider 110.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

Chat channels may be provided by the chat and video conference provider 110 to which participants are connected. Similar to the meetings discussed above, the chat channels are constructs provided by a server where the messages are received then directed to the various participants. The messages may include text, audio files, video files, image files, or any other electronic file type.

To create a meeting with the chat and video conference provider 110, a user may contact the chat and video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The chat and video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The chat and video conference provider 110 may also invalidate the meeting information, such as the meeting identifier or password/passcode.

The chat and video conference provider 110 may use a similar process as is used to create a meeting to create a chat channel. A user may contact the chat and video conference provider 110 using a client device 140-180 and select an option to create a chat channel. Such an option may be provided in a webpage accessed by a client device 140-160 or client application executed by a client device 140-160. To create the chat channel, the chat and video conference provider 110 may prompt the user for certain information, a number of participants, a type of encryption to use, whether the chat channel is confidential or open to anyone, a title or subject, etc. After receiving the various chat channel settings, the chat and video conference provider may create a record for the chat channel and generate a chat identifier to one or more user invited to the chat channel. In some examples, the certain information associated with the chat channel may be automatically generated by the chat and video conference provider 110.

To provide such functionality, one or more client devices 140-180 may communicate with the chat and video conference provider 110 using one or more communication networks, such as network 120 or the PSTN 130. The client devices 140-180 may be any suitable computing or communications device that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any LAN, MAN, WAN, cellular network (e.g., 3G, 4G, 4G LTE, 5G, etc.), or any combination of these. Other types of computing devices may be used instead or as well, such as tablets and/or smartphones.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these client devices 140-160 contact the chat and video conference provider 110 using network 120 and may provide information to the chat and video conference provider 110 to access functionality provided by the chat and video conference provider 110, such as access to create new meetings/chat channels or join existing meetings/chat channels. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak or share content in a meeting or chat, hear or view certain content shared in the meeting, or access other meeting functionality.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective chat and/or video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of chat and/or video conference functionality, thereby enabling the various client devices to create and participate in chat channels and/or video conference meetings. The chat and video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more chat channels and/or video conference meetings to the client devices 220-250.

The real-time media servers 212 provide multiplexed multimedia streams to meeting participants, such as the client devices 220-250 shown in FIG. 2. While chat and/or video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various chat and/or video and audio streams based on the target client device and communicate multiplexed streams to each client device. For example, the real-time media servers 212 receive chat and/or audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the chat and/or audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia streams in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the chat and video conference provider 210 and across many different real-time media servers 212.

Turning to the network services servers 214, these network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

The chat and video conference provider 210 may use a similar process to that which is used to schedule a meeting (as described above) to create a chat channel. A user may contact the chat and video conference provider 210 using a client device 220 and select an option to create a chat channel. After receiving various chat channel settings (e.g. a title, a participant list, etc.), the chat and video conference provider may create a record for the chat channel and generate a chat identifier to invite one or more users to the chat channel. In some examples, the certain information associated with the chat channel may be automatically generated by the chat and video conference provider 210.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples, additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting and/or a chat channel, client devices will send and receive multimedia streams via the real-time media servers 212, but they may also communicate with the network services servers 214 as needed during meetings. For example, if the host leaves the meeting or chat channel, the network services server(s) 214 may appoint another user as the new meeting host and assign host administrative privileges to that user. Hosts may have administrative privileges to allow them to manage their chat channels and/or meetings, such as by enabling or disabling screen sharing, muting or removing users from the meeting, assigning or moving users to the chat channel or meeting, recording meetings, etc. Such functionality may be managed by the network services server(s) 214.

For example, if a host wishes to remove a user from a chat channel, they may identify the user and issue a command through a user interface on their client device. The command may be sent to a network services server 214, which may then disconnect the identified user from the corresponding real-time media server 212. If the host wishes to move one or more participants into a meeting or chat channel, such a command may also be handled by a network services server 214, which may provide authentication information to the one or more participants for joining the chat channel and then connect the one or more participants to the chat channel. In some examples, a chat channel may not have a host.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request. Similar steps may be taken for ending a chat channel. For example, after receiving a command to terminate a chat channel, the network services server 214 communicate with the real time media server(s) 212 to stop a messaging service for the chat channel and remove any users from the chat channel records.

Depending on the functionality provided by the chat and video conference provider, the network services server(s) 214 may provide additional functionality, such as by providing private chat and meeting capabilities for organizations, special types of meetings (e.g., webinars), etc. Such functionality may be provided according to various examples of chat and video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive chat and/or video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosed by the chat and video conference provider 210. Because telephony devices communicate using the PSTN and not using computer networking protocols, such as TCP/IP, the telephony gateway servers 218 act as an interface that converts between the PSTN and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some chat and video conference providers may provide more or less functionality than described above and may not separate functionality into different types of servers as discussed above. Instead, any suitable servers and network architectures may be used according to different examples.

Figure 3:
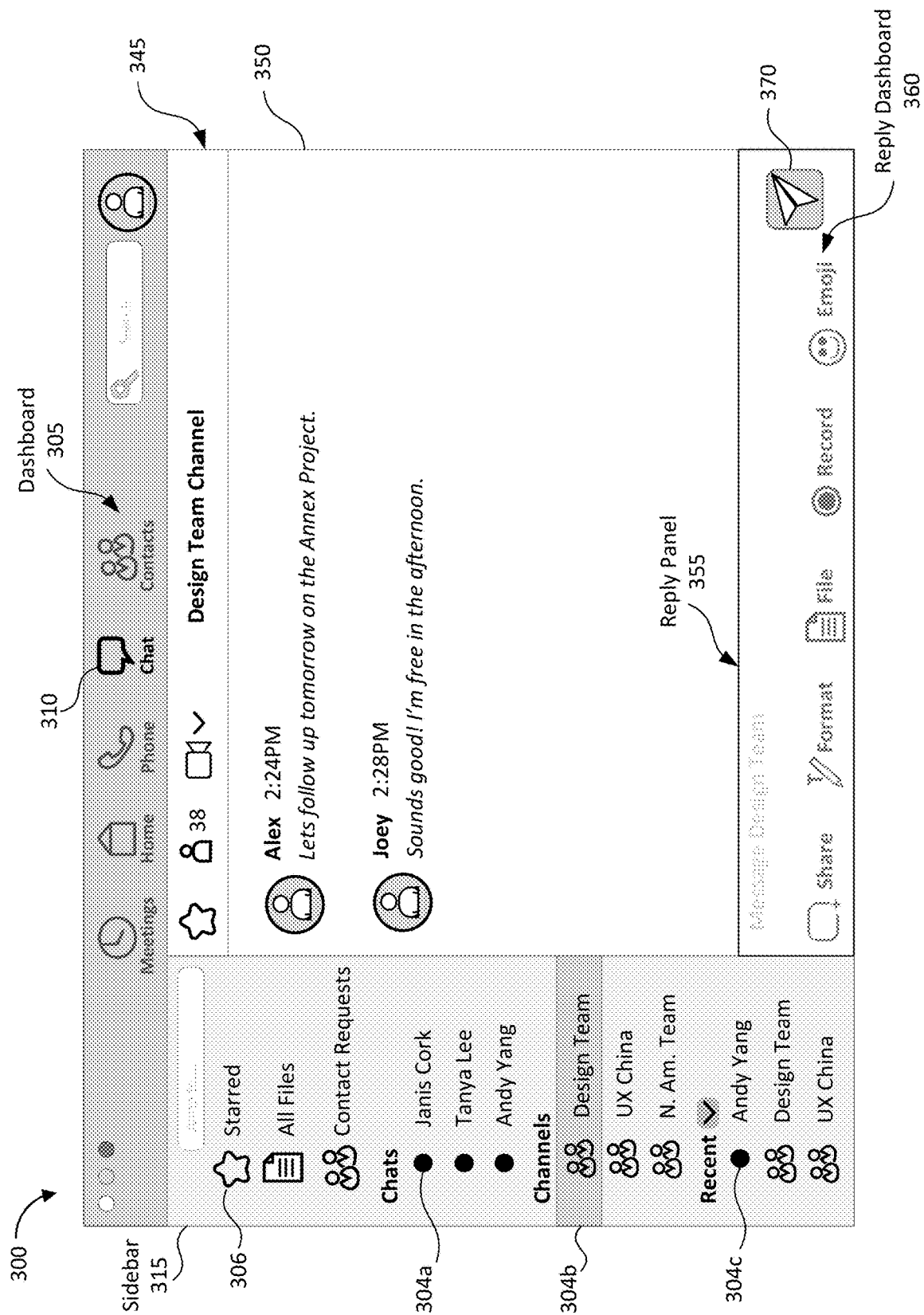
FIG. 3 shows a master chat panel, according to certain examples.

FIG. 3 shows a master chat panel 300 for a chat client according to certain examples. The master chat panel 300 may be displayed on a client device in response to information sent by a chat and video conference provider, such as the chat and video conference provider 110 in FIG. 1. The master chat panel 300 may be generated by an application, e.g., a standalone chat client or integrated into a video conferencing application, run by one or more processors stored on the client device. The client device may be a personal computer such as a desktop or laptop, a mobile device, or other computing device having at least a processor, non-transitory memory, a user input system, and communication interface, providing network connectivity.

The master chat panel 300 may include a general dashboard 305, a chat control dashboard 345, a sidebar 315, a chat window 350, a reply dashboard 360, and a reply panel 355. The general dashboard may include one or more buttons or links that switch functionalities and/or views of the master chat panel 300. For example, FIG. 3 shows a chat view, perhaps in response to a user command selecting a chat button 310 in the chat control dashboard 305. In this view, the chat window 350, the reply panel 355, and other components illustrated in FIG. 3 may be displayed on the client device. In other examples, a contacts button may be selected by a user. In response the contacts button being selected, the chat window 350, the reply dashboard 360 and the reply panel 355 may be replaced by a display a contacts window including a list of user contacts associated with the user of the client device. The sidebar 315 may be displayed alongside the contacts window. Other configurations are also possible. Various buttons on the chat control dashboard 305 may correspond to various displays of windows being displayed on the client device. Any number of components shown in FIG. 3 may be displayed on the client device with any of the various windows. Similarly, any of the components may cease to be displayed in accordance with any of the windows.

The sidebar 315 may include one or more chat channel headings. A chat heading 302a may include one or more chat channels such as the chat channel 304a. In some examples, the chat channel 304a may include a private chat, where the chat is between the user associated with the client device and another user. Messages sent and received via the chat channel 304a may only be accessed by the users in the chat channel 304a. Thus, the client devices associated with the user and the client device associated with the other user may securely communicate with each other.

A chat channel heading 302b may include a chat channel 304b. The chat channel 304b may by a group chat, where two or more users have access to send and receive messages within the chat channel. In some examples, the chat channel 304b may only be accessed by users who have permission to enter the chat channel. A host of the chat channel 304b and/or the chat and video conference provider may grant access to the chat channel 304b. Although only the chat channel headings 302a-b are shown, other chat channel headings are possible. For example, some examples may include a chat channel heading that displays, on the client device, only those channels that the user associated with the client device is a member of that have been recently accessed. "Recently accessed" may be determined by the client device to be a fixed number of most recent channels accessed by the user, or may be only those channels access within a certain time, calculated from the current time.

The sidebar 315 may also include one or more combinatory headings, such as starred combinatory heading 306. A combinatory heading may aggregate one or more messages from one or more chat channel, according a predetermined criterion. The combinatory headings may include a link that, in response to a user command, cause the client device to display one or more messages in the chat window 350. The messages may be gathered from one or more chat channels, such as the chat channel 304a-c, and displayed based on predetermined criteria. In FIG. 3, for example, the starred combinatory heading 306 may gather only those messages that have been marked by a user of the client device. The marked messages may be stored at the client device, and/or may be stored at the chat and video conference provider. The link may cause the one or more processors included on the client device to determine which messages are marked messages and cause them to be displayed in the chat window 350. In some examples, the link may cause the client device to send a signal to the chat and video conference provider. The chat and video conference provider may then determine which messages are marked messages and send information to the client device to generate a display of the marked messages in the chat window 350.

Other combinatory headings (and associated links and functionality) are also considered. Other examples may include an unread heading, an all files heading, a contact request heading, and others. As with the starred combinatory heading 306, an associated link may cause the client device and/or the chat and video conference provider to determine which messages (if any) meet predetermined criteria associated with the combinatory heading and subsequently display those messages on the client device.

The chat control dashboard 345 may display one or more control buttons and/or information regarding the chat channel currently being displayed on the client device. The control buttons may include links that mark a message (e.g. to mark it such that it is determined to be a marked message via the starred combinatory heading 306), begin a video conference, schedule a meeting, create a video message, or other tasks. The chat control dashboard may also include a title of the chat channel currently being displayed on the client device and/or a number of users with access to the chat channel. One of ordinary skill in the art would recognize many different possibilities and configurations.

The reply panel 355 may include an input field, where the user may cause the client device to send a message to the chat channel. The input field may be accessed by a peripheral device such as a mouse, a keyboard, a stylus, or any other suitable input method. In some examples, the input field may be accessed by a touchscreen or other system built into the client device. In some examples, a notification may be sent from the client device and/or the video conference provider that indicates a response is being entered in to the input field by the user. In other examples, no notification may be sent.

The reply dashboard 360 may include one or more buttons that, in response to a user command edit or modify a response input into the input field. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 360. The one or more formatting buttons may change the appearance of a replay entered in the input field. The user may thereby edit and customize their response in the input field before sending.

The reply dashboard 360 may include a send button 370. The send button 370 may, in response to a user command, cause the client device to send the contents of the input field (or "response") to the chat channel. The client device may then send the response to the chat and video conference provider. The chat and video conference provider may then send the response to the chat channel, which publishes the response for the users in the channel. The response may include image files such as JPEG, PNG, TIFF, or files in any other suitable format. The response may also include video files such as MPEG, GIF, or video files in any other suitable format. The response may also include text entered into the input field and/or other files attached to the message such as a PDF, DOC, or other file format.

Figure 4:
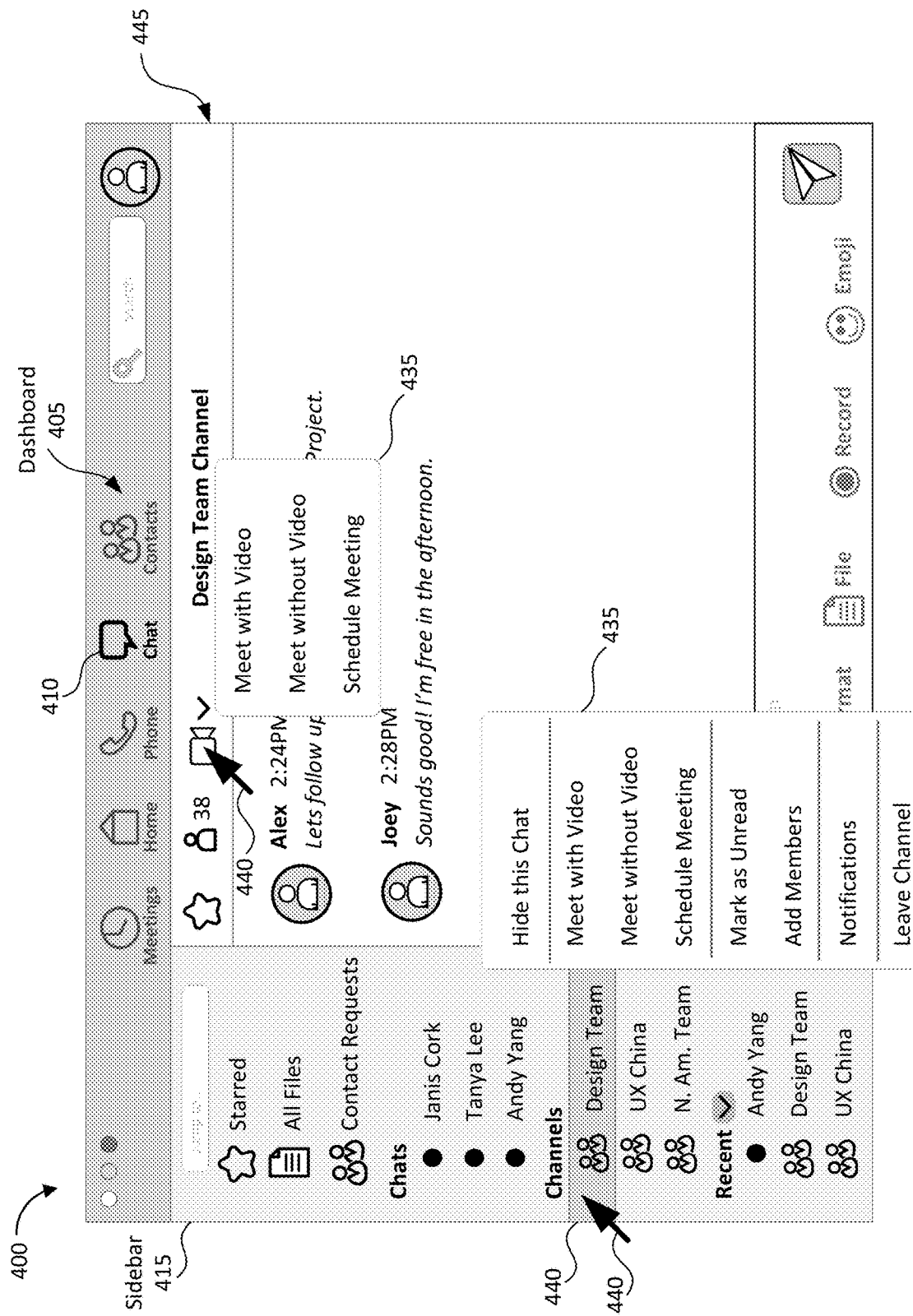
FIG. 4 shows a master chat panel with a menu, according to certain examples.

FIG. 4 shows a master chat panel 400 with a menu 435, according to certain examples. The master chat panel 400 may be similar to the master chat panel 300. Thus, even where not specified, the master chat panel 400 may include at least those components and functionalities described in relation to FIG. 3.

The master chat panel 400 may include menus 435. The menu 435 may include one or more buttons, which add functionality to the messages in the chat channels and/or the chat channels themselves. The menu 435 may be displayed in response to a user request on the client device. In the illustrated example, the user may have requested the menu 435 associated with a design team chat channel 404. The user may have requested the menu 435 from the client device using the cursor 440. In some examples, mousing over a channel may cause the menu 435 to be displayed. In other examples, the menu 435 may be displayed in response to another user input (e.g., a right-click on the mouse while hovering over the design team chat channel 404). In other examples, the menu 435 may be displayed by a user input occurring in another space rather than the design team chat channel 404. For example, the menu 435 may be brought up by an input in a blank space of a chat window 450. One of ordinary skill in the art would recognize many different possibilities.

The menu 435 may include options associated with a chat channel. Those options may include starting a video conference (or "meeting"), scheduling a meeting, adding or removing members from the chat channel, changing setting associated with notifications sent to the client device, no longer displaying the chat channel in sidebar 415, recording a video message, and other such options. In some examples, the menu 435 may include options for a specific chat within the chat channel. For example, the menu 435 may include an option to mark a message as unread.

Although the menu 435 is illustrated as being opened from the design team chat channel 404 on the sidebar 415, the menu 435 may be opened from elsewhere. The menu 435 may display the same functions or different functions depending on where it is opened. For example, there may be a button on the chat control dashboard 445 that causes the client device to open the menu 435. Opening the menu 435 from the chat control dashboard 445 may only display functions related to a video meeting, for example. Functions related to a specific message in the chat may only be displayed in the menu 435 if the client device receives a user input on the specific message.

Figure 5:
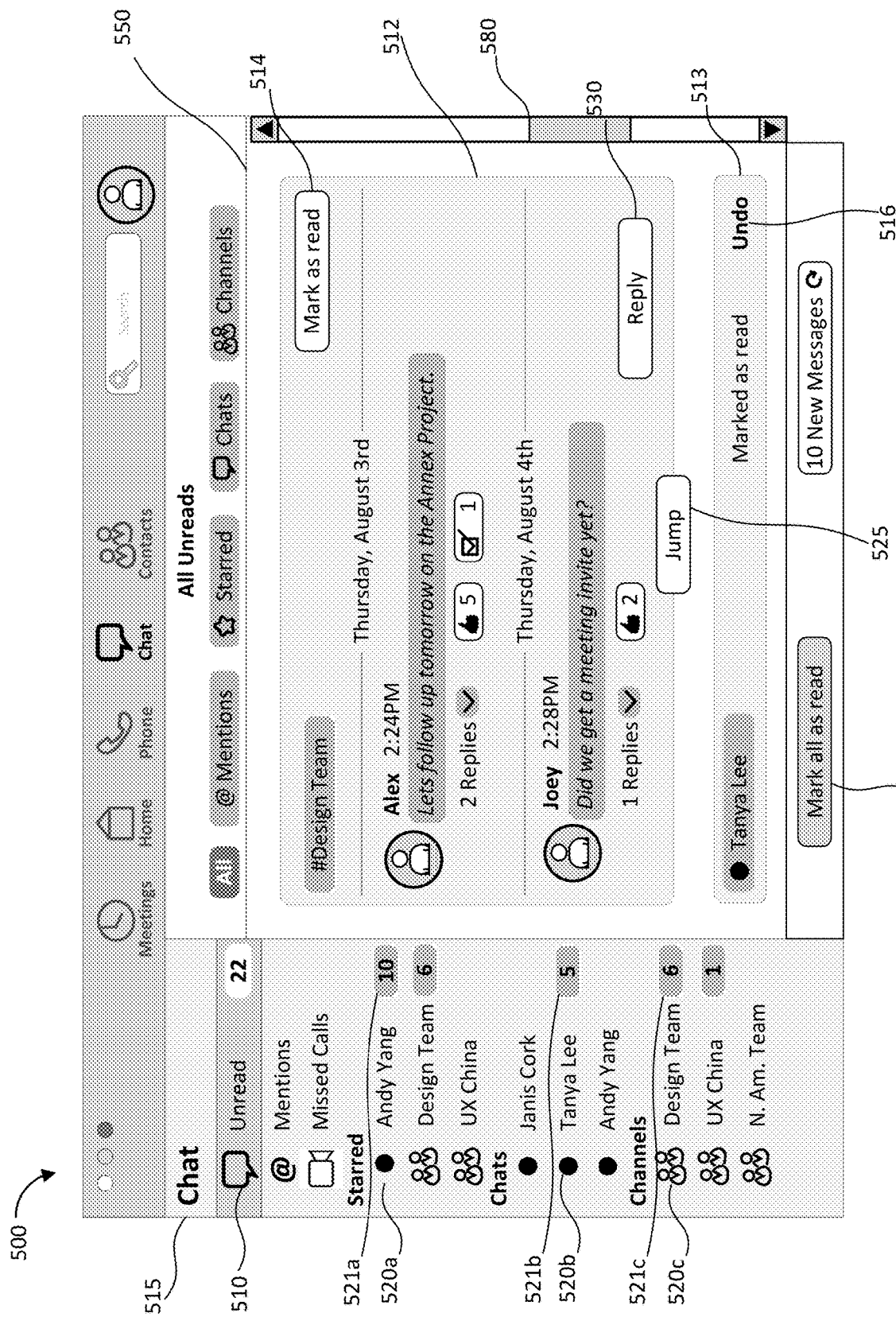
FIG. 5 shows a master chat panel displaying an unread landing page according to certain examples.

FIG. 5 shows a master chat panel 500 displaying an unread landing page 550 according to certain examples. The master chat panel 500 may be similar to the master chat panel 400 and therefore have some or all of the same components and functionalities. The master chat panel 500 may include a sidebar 515 that further includes one or more combinatory headings (as described in FIG. 3) and chat channel buttons 520a-c. The chat channels associated with the chat channel buttons 520a-c may include chats between the user and one other participant or chat channels with two or more participants. The chat channel buttons 520a-c may be organized based on criteria such as number of participants in the associated channel, frequency of use by the user, a user-defined selection (e.g., a grouping of chat channels determined by a user choice), or any other appropriate method.

The chat channel buttons 520a-c may include links that, in response to a user input, cause the client device to display the associated chat channel in the master chat panel 500. For example, the chat channel button 520a may include a link that causes a chat channel associated with "Andy Yang" to be displayed in a chat window similar to the chat window 350 in FIG. 3. Similarly, the chat channel button 520c may include a link that causes a chat channel associated with "Design Team" to be displayed in the chat window.

The chat channel buttons 520a-c may also include unread indicators 521a-c, respectively. The unread indicators 521a-c may display a number of unread messages within the chat channels associated with the chat channel buttons 520a-c. For example, as shown in FIG. 5, the unread indicator 521a for chat channel button 520a indicates that there are ten unread message in the associated chat channel. The unread indicator 521b for chat channel button 520b indicates that there are five unread messages in the associated chat channel, while the unread indicator 521c for chat channel 520c indicate that there are six unread messages in the associated chat channel.

The values shown in the unread indicators 521a-c may be changed by the client device. For example, the client device may receive a new unread message via the chat channel associated with the chat channel button 520a from a chat and video conference provider similar to the chat and video conference provider 110 in FIG. 1. The unread indicator 521a for chat channel button 520a may then be updated by the client device to indicate that there are eleven unread messages in the associated chat channel. Similarly, the unread indicators 521a-c for the chat channel buttons 520a-c may decrease if the user reads an unread message from an associated chat channel. In some embodiments, the client device may update the unread indicators 512a-c associated with a chat channel button 520a-c in response to displaying the associated chat channel in the chat window, as discussed above. The number displayed by the unread indicators 521a-c may also be reduced by the client device in response to a user command corresponding to one or more buttons included in the unread landing page 550, discussed in more detail below.

In some embodiments, track the individual status of each of the messages directed to the user. The chat and video conference provider may have a record of a read-status associated with each messages directed to the user. The chat and video provider may provide information about the messages such that the client device updates the unread indicators 521a-c accordingly.

The unread landing page 550 may be displayed on the client device in response to a user input. The user input may correspond to an unread button 510. The unread button may be included in a sidebar 515 and may be a combinatory heading, as described in relation to FIG. 3. In response to the user input corresponding to the unread button 510, the client device may determine that one or more messages in one or more chat channels, directed to a user associated with the client device, are unread messages. The client device may aggregate the unread messages from the one or more chat channels and display the unread messages on the unread landing page 550. In some embodiments, the chat and video conference provider may aggregate the unread messages based on the record of the read status associated with each message. The chat and video conference provider may then provide information to the client device to generate and display the unread landing page 550.

The unread landing page 550 may display an unread message 512 and a message-read notification 513. As shown in FIG. 5, the unread message 512 may be received via the "Design Team" chat channel, whereas the message associated with the message-read notification 513 may be received via a chat with "Tanya Lee." Although the unread message 512 and message associated with the message-read notification 513 are shown from only two chat channels, the unread landing page may include any number of unread messages from any number of chat channels. For example, a message from the chat channel "Andy Yang" may be displayed on the unread landing page 550, although not shown in FIG. 5. Unseen messages may be displayed on the unread landing page 550 in response to a user input corresponding to a scroll bar 580. The scroll bar 580 may allow the user to view portions of the unread landing page 550 both above and below a current display.

The unread message 512 may include one or more messages from an associated chat channel. In some embodiments, one or more preceding messages from the chat channel associated with the unread message 512 may be displayed, even if the preceding messages have been read by the user. In this way, the user may be provided context for the unread message. The unread message 512 may include a date and time the message was received, a name of a participant that posted the unread message 512, an indication of replies to the message to the unread message 512, reactions to the unread message 512 by other participants, and other information associated with the message.

The unread message 512 may also include a jump button 525. In response to a user command associated with the jump button 525, the client device may cause the chat channel associated with the unread message 512 (in FIG. 5, the "Design Team" chat channel) to be displayed in the chat window, with the unread message 512 itself displayed for the user to see in the chat channel. The client device may then update the unread indicators 521c for the associated chat channel button 520c. In some embodiments, the unread indicator 521c may display zero, as all messages in the chat channel are read.

In some embodiments, the client device may transmit a signal to the chat and video conference provider including an update to one or more messages (e.g., that a message went from "unread" to "read."). The chat and video conference provider may then send an updated status to the client device. The client device may then remove the unread status of the message and remove the message from the unread landing page. Similarly, the chat and video provider may send a signal that causes all messages in a chat channel to be marked as read and removed from the unread landing page 550. In both instances, the client device may then update the unread indicators 521a-c accordingly.

The unread message 512 may also include a mark-as-read button 514. In response to a user command corresponding to the mark-as-read button 514, the client device may flag the unread message as read. The client device may then update the unread indicators 521a-c on the associated chat channel button 520a-c, reducing the number displayed by the number of chats included in the unread message 512a.

The unread landing page 550 may also display a message-read notification 513. The client device may generate the message-read notification 513 in response to an unread message being flagged as read. In the present example, the message-read notification 513 may be associated with an associated unread message from the chat channel associated with the chat channel button 520b. The associated unread message may have been previously displayed in the unread landing page 550, and may have been similar to the unread message 512, including an associated mark-as-read button similar to the mark-as-read button 514. The client device may have flagged the associated unread message as read in response to a user input corresponding to the associated mark-as-read button. The client device may send an update signal to the chat and video conference provider, causing the record of the message to be updated accordingly. The client device may then have generated the message-read notification 513 and displayed the message-read notification 513 in the unread landing page 550. In some embodiments, the client device may generate the message-read notification 513 in response to a signal from the chat and video conference provider. The unread notification for the associated chat channel button 520a-c may then be updated accordingly by the client device. In some embodiments, the message-read notification is displayed for a limited amount of time, such as 3 seconds.

The message-read notification 513 may include an undo button 516. In response to a user input corresponding to the undo button 516, the associated unread message may be redisplayed on the unread landing page. The unread notification for the associated chat channel button 520a-c may then be updated accordingly by the client device.

The unread landing page 550 may include a mark-all-as-read button 518. In response to a user command corresponding to the mark-all-as-read button 518, the client device may flag all of the unread messages displayed in the unread landing page 550 as read. The client device may then generate a message-read notification similar to the message-read notification 513 for each of the unread messages in the unread landing page 550. The client device may also update the unread notification for the associated chat channel button 520a-c accordingly.

The unread message 512 may also include a reply button 530. In response to a user command corresponding to the reply button 530, the client device may generate a replay window as is described below in FIG. 6. In some embodiments, the reply button may not be included in the unread message 512. The response window may be generated in response to a user input such as a mouse click on the unread message 512 or from a menu such as the menu 435 described in FIG. 4.

Figure 6:
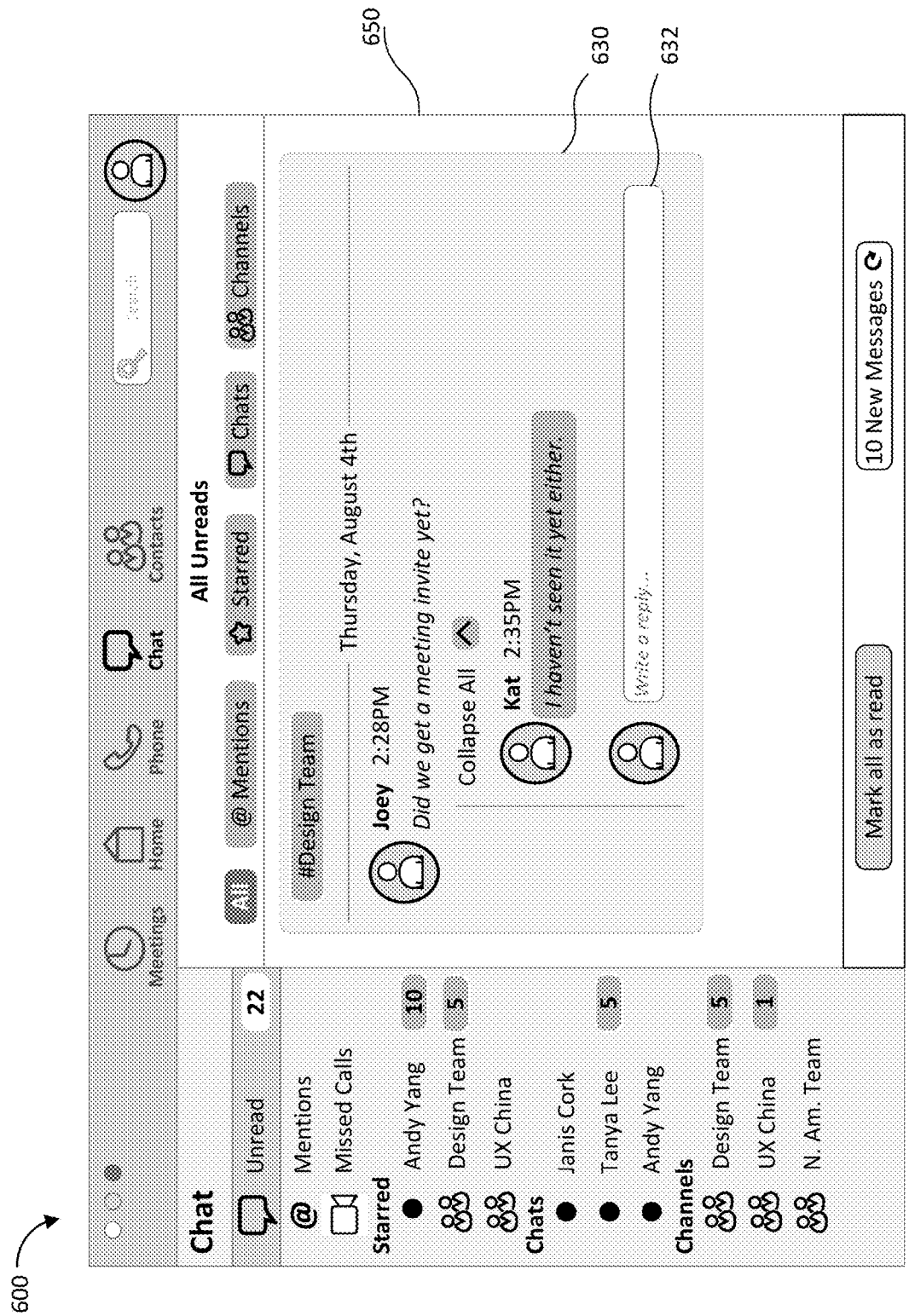
FIG. 6 shows a master chat panel including an unread landing page with a response window, according to certain examples.

FIG. 6 shows a master chat panel 600 including an unread landing page 650 with a response window 630, according to certain examples. The master chat panel 600 may be similar to the master chat panel 500 in FIG. 5 and therefore include some or all of the components and functionalities included therein. Similarly, the unread landing page 650 may be similar to the unread landing page 650 and therefore include some or all of the components and functionalities included therein. FIG. 6 may show the unread landing page 650 as displaying the response window 630. The response window 630 may have been generated in response to a user input corresponding to a reply button included on an associated unread message such as the reply button 520 included in the unread message 512 in FIG. 5. In some examples, only the associated unread message and response window 630 are displayed on the unread landing page 650. In other examples, other unread messages may continue to be displayed on the unread landing page 650.

The response window 630 may include one or more messages from an associated chat channel. In some embodiments, one or more preceding messages from the chat channel associated with the response window 630 may be displayed, even if the preceding messages have been read by the user. In this way, the user may be provided context for the unread message. The response window 630 may also include a date and time the message was received, a name of a participant that generated the response window 630, an indication of replies to the message to the response window 630, reactions to the response window 630 by other participants, and other information associated with the message.

The response window 630 includes an input field 632 to allow the user to provide a user input in the input field 632, such as creating a response message. In some embodiments, the client device may determine that the user is inputting information in the input field 632. The client device may then transmit a responding notification to the chat and video conference provider via the chat channel. The chat and video conference provider may then provide the responding notification to one or more client devices via the chat channel. In other words, participants of the chat channel, associated with the one or more client devices, may receive a notification that the user is responding to the unread message as they are entering an input in the input field 632. The responding notification may be text (such as "responding"), an image, an animation (e.g., blinking ellipses), or any other such notification. In other embodiments, no responding notification is generated by the client device, and thus the participants receive no notification that the user is entering an input into input field 632.

The client device may then transmit the response message to the chat and video conference provider (e.g., the chat and video conference provider 110 in FIG. 1) and then update an unread notification on an associated chat channel button, such as the unread notification for the chat channel button 520c in FIG. 5. The client device may then remove the response window 630 from the unread landing page 650. After receiving the response message, the chat and video conference provider may transmit the response message via the chat channel associated with the unread message to one or more client devices. The one or more client devices may then display the response message in the chat channel. The client device associated with the user may also display the response message in the chat channel. The client device may not display the response message in the unread landing page, as the response message was created by the user.

Figure 7:
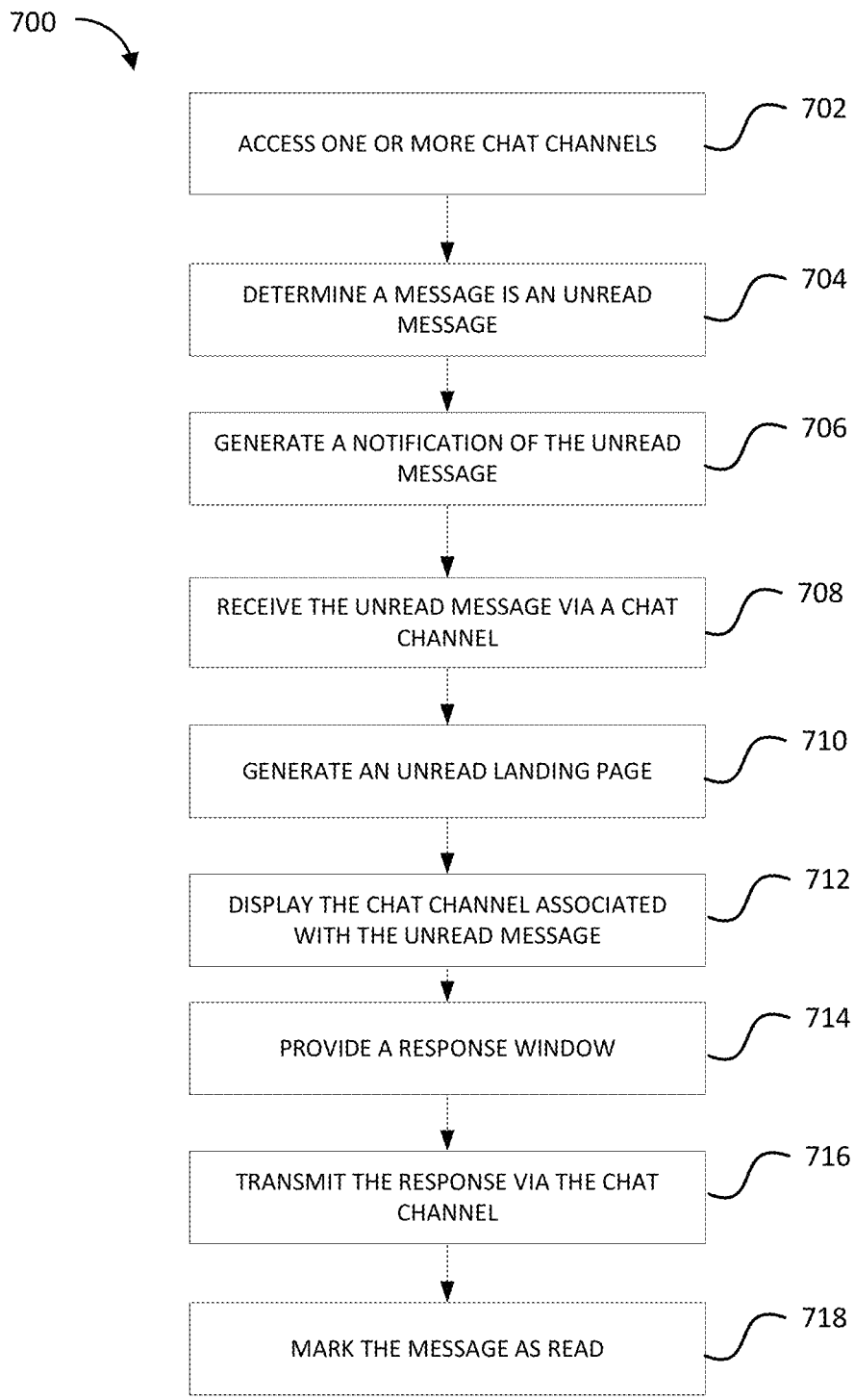
FIG. 7 shows a method for providing an unread landing page, according to certain examples.

FIG. 7 shows a method 700 for providing an unread landing page, according to certain examples. The method 700 may be performed utilizing any of the systems disclosed herein, such as the system 100 in FIG. 1 and/or the system 200 in FIG. 2, and by a system such as that disclosed in FIG. 8. At 702, a client device may access one or more chat channels, where one or more users may exchange messages via the chat channels. In some examples, the chat channel may be established by a chat and video conference provider, as is described in relation to FIGS. 1 and 2. In some examples, more than one chat channels may be established. The chat channels may be displayed on the first client device in a master chat panel, such as the master chat panel 400 in FIG. 4. The master chat panel may include chat channel buttons, such as the chat channel buttons 520a-c in FIG. 5, where each chat channel button is associated with a chat channel.

At 704, the client device may determine that one or more messages are directed to the user via the one or more chat channels. The client device may further determine that the messages are unread messages. The client device may store a record of messages accessed by a user associated with the client device, or the client device may receive a read status from the chat and video conference provider.

At 706, the client device may generate a notification of the unread messages corresponding to the one or more chat channels. The notification of the unread messages may be provided as an unread indicator on each of the chat channel buttons. In relation to FIG. 5, the unread indicator 521a-c may display a number of unread messages within the chat channel associated with the chat channel buttons 520a-c. For example, as shown in FIG. 5, the unread indicator 521a for chat channel button 520a may indicate that there are ten unread message in the associated chat channel. The unread indicator 512b for chat channel button 520b may indicate that there are five unread messages in the associated chat channel, while the unread indicator 521c for chat channel 520c may indicate that there are six unread messages in the associated chat channel.

At 708, the client device may receive a new unread message via the chat channel associated with the chat channel button from the chat and video conference provider similar to the chat and video conference provider 110 in FIG. 1. The unread indicator for chat channel may then be updated by the client device accordingly. Similarly, the unread indicator for the chat channel buttons may decrease if the user reads an unread message from an associated chat channel.

At 710, an unread landing page may be generated by the client device. The unread landing page may include the one or more unread messages from each of the one or more chat channels. The unread landing page thus may display unread messages from multiple channels. For example, as shown in FIG. 5, the unread message 512 may be received via the "Design Team" chat channel, whereas the message 512b may be received via a chat with "Tanya Lee." Although the messages 512a-b are shown from only two chat channels, the unread landing page may messages from any number of chat channels.

At 712, the client device may display the chat channel associated with the an unread message. Each unread message on the unread landing page may include a jump button. The jump button may be similar to the jump button 525 in FIG. 5. In response to an input corresponding to the jump associated with an unread message, the client device may remove the unread message from the landing page. The client device may then determine a chat channel associated with the unread message. The client device may then display the chat channel associated with the unread message. The client device may then update the unread indicator for the associated chat channel button. In some embodiments, the unread indicator may display zero, indicating that all messages in the chat channel are read.

At 714, the client device may mark the unread message as "read." The client device may mark the message as read in response to a user input, such as the user input associated with the mark-as-read button 514 in FIG. 5 The client device may mark the message as read in response to displaying the chat channel associated with the unread message, as is described above in relation to 712. The client device may also mark the unread message as read in response to a response message, as described below.

At 716, client device may provide a response window via the unread landing page. The response window may include one or more messages from an associated chat channel. One or more preceding messages from the chat channel associated with the response window may be displayed, even if the preceding messages have been read by the user. In this way, the user may be provided context for the unread message. The response window may also include a date and time the message was received, a name of a participant that generated the response window, an indication of replies to the message to the response window, reactions to the response window by other participants, and other information associated with the message. The response window may also include options configured to provide one or more reactions via the chat channel. The reactions may include images, animations, sounds, or other such reactions.

The response window may include an input field. The client device may receive a user input in the input field, creating a response message. In some embodiments, the client device may determine that the user is inputting information in the input field. The client device may then transmit a responding notification to the chat and video conference provider via the chat channel. The chat and video conference provider may then provide the responding notification to one or more client devices via the chat channel. In other words, participants of the chat channel, associated with the one or more client devices, may receive a notification that the user is responding to the unread message as they are entering an input in the input field. The responding notification may be text (such as "responding"), an image, an animation (e.g., blinking ellipses), or any other such notification. In other embodiments, no responding notification is generated by the client device, and thus the participants receive no notification that the user is entering an input into the input field.

At 718, the client device may then transmit the response message to the chat and video conference provider and update an unread notification on an associated chat channel button, such as the unread notification for the chat channel button 520*b* in FIG. 5. The client device may then remove the response window from the unread landing page. After receiving the response message, the chat and video conference provider may transmit the response message via the chat channel associated with the unread message to one or more client devices. The one or more client devices may receive and display the response message in the chat channel. The client device associated with the user may also display the response message in the chat channel. The client device may not display the response message in the unread landing page, as the response message was created by the user.

The method 700 above may be performed including any of the steps shown in FIG. 7 and described above. The steps may be performed in any order, and may include steps that are not listed or shown. Furthermore, some steps may be optional. For example, any or all of steps 708, 712, 714, 716, and 718 may be omitted from the method 700 according to certain examples.

Figure 8:
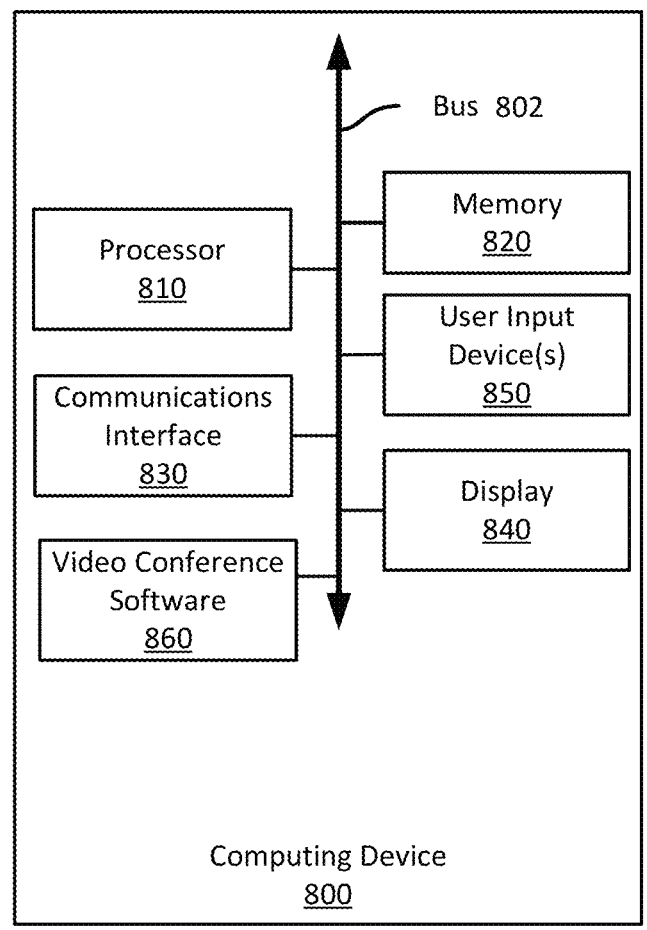
FIG. 8 shows an example computing device suitable for use in example systems or methods for providing an unread landing page, according to certain examples.

FIG. 8 shows an example computing device 800 suitable for use in example systems or methods for providing an unread landing page. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing an unread landing page, such as part or all of the example method 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user. The computing device 800 may also include a video conference software 860. The video conference software 860 may include a chat client, a video conference platform, and any other software to enable communication from a first user to a second user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a non-transitory computer-readable medium including a communications interface and a processor, communicatively coupled to the non-transitory computer-readable medium and the communications interface. The processor may be configured to execute processor executable instructions stored in the non-transitory computer-readable medium. The processor may access one or more chat channels, where the one or more chat channels are established by a chat and video conference provider. The processor may determine that one or more messages, directed to a user via the one or more chat channels, includes one or more unread messages. The processor may generate a notification of the one or more unread messages corresponding to the one or more chat channels. The processor may generate an unread landing page including the one or more unread messages from each of the one or more chat channels.

Example 2 is the system of any previous or subsequent example, where the processor executable instructions are further configured to cause the processor to provide, via the unread landing page, a response window associated with an unread message of the one or more unread messages. The processor may transmit, to the chat and video conference provider, a responding notification; receive, by one or more client devices, the responding notification via a chat channel associated with the unread message. The processor may transmit, to the chat and video conference provider, a response message corresponding to the unread message via the unread landing page. The processor may receive, from the chat and video conference provider, the response message by the one or more client devices via a chat channel associated with the unread message.

Example 3 is the system of any previous or subsequent example, where the response window includes options configured to provide one or more reactions to the chat channel associated with the unread message.

Example 4 is the system of any previous or subsequent example, where the unread landing page includes a mark-as-read button for each of the one or more unread messages, and where the processor executable instructions are further configured to cause the processor to determine a selection of the mark-as-read button associated with an unread message.

The processor may remove the unread message from the one or more unread messages on the unread landing page. The processor may generate an undo button on the unread landing page, the undo button configured to cause the unread message to be redisplayed on the landing page.

Example 5 is the system of any previous or subsequent example, where the processor executable instructions are further configured to cause the processor to display one or more preceding messages received from the chat and video conference provider via one or more chat channels, on the unread landing page where the one or more preceding messages are associated with one of the one or more unread messages.

Example 6 is the system of any previous or subsequent example, where the processor executable instructions are further configured to cause the processor to provide, via the unread landing page, a response window associated with an unread message of the one or more unread messages. The processor may transmit, to the chat and video conference provider, a response message corresponding to the unread message via the unread landing page. The processor may receive, from the chat and video conference provider, the response message to a chat channel associated with the unread message.

Example 7 is the system of any previous or subsequent example, where the unread landing page includes a jump button for each of the one or more unread messages, and where the processor executable instructions are further configured to cause the processor to receive an input corresponding to a selection of the jump button associated with an unread message. The processor may remove, from the unread landing page, the unread message associated with the selection of the jump button. The processor may determine a chat channel associated with the unread message. The processor may display the chat channel associated with the unread message.

Example 8 is the system of any previous or subsequent example, where the processor executable instructions to generate, a notification of the one or more unread messages corresponding to the one or more chat channels, are further configured to cause the processor to provide, via a sidebar, a first unread indicator of a first unread message from the one or more unread messages corresponding to a first chat channel of the one or more chat channels. The processor may provide, via the sidebar, a second unread indicator of a second unread message from the one or more unread messages corresponding to a second chat channel of the one or more chat channels.

Example 9 is a method for generating an unread landing page. The method may include accessing one or more chat channels, where the one or more chat channels are established by a chat and video conference provider. The method may include determining that one or more messages, directed to a user via the one or more chat channels, include one or more unread messages. The method may include generating a notification of the one or more unread messages corresponding the one or more chat channels. The method may include generating an unread landing page including the one or more unread messages from each of the one or more chat channels.

Example 10 is the method of any previous or subsequent example, further inlcuding providing, via the unread landing page, a response window associated with an unread message of the one or more unread messages. The method may include transmitting, to the chat and video conference provider, a responding notification. The method may include receiving, by one or more client devices, the responding notification to a chat channel associated with the unread message. The method may include transmitting, to the chat and video conference provider, a response message corresponding to the unread message via the unread landing page. The method may include receiving, from the chat and video conference provider, the response message by the one or more client devices via a chat channel associated with the unread message.

Example 11 is the method of any previous or subsequent example where the response window includes options configured to provide one or more reactions to the chat channel associated with the unread message.

Example 12 is the method of any previous or subsequent example, further including: providing, via the unread landing page, a response window associated with an unread message of the one or more unread messages. The method may include transmitting, to the chat and video conference provider, a response message corresponding to the unread message via the unread landing page. The method may include receiving, from the chat and video conference provider, the response message by one or more client devices via a chat channel associated with the unread message.

Example 13 is the method of any previous or subsequent example, further including: displaying one or more preceding messages received from the chat and video conference provider via one or more chat channels, on the unread landing page where the one or more preceding messages are associated with one of the one or more unread messages.

Example 14 is the method of any previous or subsequent example, where the unread landing page includes a jump button for each of the one or more unread messages, the method further including: receiving an input corresponding to a selection of the jump button associated with an unread message. The method may include removing, from the unread landing page, the unread message associated with the selection of the jump button. The method may includ determining a chat channel associated with the unread message. The method may include displaying the chat channel associated with the unread message.

Example 15 is the method of any previous or subsequent example, where generating a notification of the one or more unread messages corresponding the one or more chat channels further includes: providing, via a sidebar, a first unread notification of a first unread message from the one or more unread messages corresponding to a first chat channel of the one or more chat channels. The method may include providing, via the sidebar, a second unread notification of a second unread message from the one or more unread messages corresponding to a second chat channel of the one or more chat channels.

Example 16 is a non-transitory computer-readable medium including processor-executable instructions configured to cause one or more processors to: access one or more chat channels, where the one or more chat channels are established by a chat and video conference provider. The one or more processors may determine that one or more messages, directed to a user via the one or more chat channels, include one or more unread messages. The one or more processors may generate a notification of the one or more unread messages corresponding the one or more chat channels. The one or more processors may generate an unread landing page including the one or more unread messages from each of the one or more chat channels.

Example 17 is the non-transitory computer-readable medium of any previous or subsequent example, where the processor-executable instructions are further configured to cause one or more processors to: provide, via the unread landing page, a response window associated with an unread message of the one or more unread messages. The one or more processors may transmit, to the chat and video conference provider, a responding notification, where the chat and video conference provider posts the responding notification to a chat channel associated with the unread message. The one or more processors may transmit, to the chat and video conference provider, a response message corresponding to the unread message via the unread landing page. The one or more processors may receive, from the chat and video conference provider, the response message by one or more client devices via a chat channel associated with the unread message.

Example 18 is the non-transitory computer-readable medium of any previous or subsequent example, where the processor-executable instructions are further configured to cause one or more processors to: provide, via the unread landing page, a response window associated with an unread message of the one or more unread messages. The one or more processors may transmit, to the chat and video conference provider, a response message corresponding to the unread message via the unread landing page. The one or more processors may receive, from the chat and video conference provider, the response message to a chat channel associated with the unread message.

Example 19 is the non-transitory computer-readable medium of any previous or subsequent example, where the unread landing page includes a jump button for each of the one or more unread messages, and the processor-executable instructions are further configured to cause the one or more processors to: receive an input corresponding to a selection of the jump button associated with an unread message. The one or more processors may remove, from the unread landing page, the unread message associated with the selection of the jump button. The one or more processors may and determine a chat channel associated with the unread message. The one or more processors may display the chat channel associated with the unread message.

Example 20 is the non-transitory computer-readable medium of any previous or subsequent example, where the processor executable instructions to generate, a notification of the one or more unread messages corresponding the one or more chat channels, are further configured to cause the one or more processors to: provide, via a sidebar, a first notification of a first unread message from the one or more unread messages corresponding to a first chat channel of the one or more chat channels. The one or more processors may provide, via the sidebar display, a second notification of a second unread message from the one or more unread messages corresponding to a second chat channel of the one or more chat channels.

What is claimed is:

1. A system comprising:
a non-transitory computer-readable medium;
a communications interface; and
a processor communicatively coupled to the non-transitory computer-readable medium and the communication interface, the processor configured to execute processor executable instructions stored in the non-transitory computer-readable medium to:
access one or more chat channels, wherein the one or more chat channels are established by a chat and video conference provider;
determine that one or more messages, directed to a user via the one or more chat channels, comprise one or more unread messages;

generate a notification of the one or more unread messages corresponding to the one or more chat channels, wherein the notification includes a numerical value indicating how many unread messages correspond to the one or more chat channels;

generate an unread landing page comprising the one or more unread messages from each of the one or more chat channels, wherein the unread landing page includes a respective jump button corresponding to each unread message of the one or more unread messages, each respective jump button being selectable by the user to display a corresponding chat channel containing the corresponding unread message; and provide, via the unread landing page, a response window associated with an unread message of the one or more unread messages.

2. The system of claim 1, wherein the processor executable instructions are further configured to cause the processor to:

transmit, to the chat and video conference provider, a responding notification indicating that the user is drafting a response message; and transmit, to the chat and video conference provider, the response message corresponding to the unread message via the unread landing page.

3. The system of claim 1, wherein the response window comprises options configured to provide one or more reactions to the chat channel associated with the unread message.

4. The system of claim 1, wherein the unread landing page comprises a mark-as-read button for each of the one or more unread messages, and wherein the processor executable instructions are further configured to cause the processor to:

determine a selection of the mark-as-read button associated with an unread message;

remove the unread message from the one or more unread messages on the unread landing page; and generate an undo button on the unread landing page, the undo button configured to cause the unread message to be redisplayed on the unread landing page.

5. The system of claim 1, wherein the processor executable instructions are further configured to cause the processor to:

display, on the unread landing page, one or more preceding messages received from the chat and video conference provider via one or more chat channels, wherein the one or more preceding messages are associated with one of the one or more unread messages.

6. The system of claim 1, wherein the processor executable instructions are further configured to cause the processor to:

receive an input corresponding to a selection of the jump button associated with an unread message; and in response to receiving the input:

remove, from the unread landing page, the unread message associated with the selection of the jump button;

determine a chat channel associated with the unread message; and display the chat channel associated with the unread message.

7. The system of claim 1, wherein the processor executable instructions are further configured to cause the processor to:

provide, via a sidebar, a first unread indicator of a first unread message from the one or more unread messages corresponding to a first chat channel of the one or more chat channels; and provide, via the sidebar, a second unread indicator of a second unread message from the one or more unread messages corresponding to a second chat channel of the one or more chat channels.

8. A method for generating an unread landing page, the method comprising:

accessing one or more chat channels, wherein the one or more chat channels are established by a chat and video conference provider;

determining that one or more messages, directed to a user via the one or more chat channels, comprise one or more unread messages;

generating a notification of the one or more unread messages corresponding to the one or more chat channels, wherein the notification includes a numerical value indicating how many unread messages correspond to the one or more chat channels;

generating an unread landing page comprising the one or more unread messages from each of the one or more chat channels, wherein the unread landing page includes a respective lump button corresponding to each unread message of the one or more unread messages, each respective jump button being selectable by the user to display a corresponding chat channel containing the corresponding unread message; and providing, via the unread landing page, a response window associated with an unread message of the one or more unread messages.

9. The method of claim 8, further comprising:

transmitting, to the chat and video conference provider, a responding notification indicating that the user is drafting a response message; and transmitting, to the chat and video conference provider, the response message corresponding to the unread message via the unread landing page.

10. The method of claim 8, wherein the response window comprises options configured to provide one or more reactions to the chat channel associated with the unread message.

11. The method of claim 8, further comprising:

providing, via the unread landing page, the response window associated with an unread message of the one or more unread messages;

receiving, via the response window in the unread landing page, a response message corresponding to the unread message; and transmitting, to the chat and video conference provider, the response message corresponding to the unread message.

12. The method of claim 8, further comprising:

in response to a user interaction with a button related to the unread message, displaying, in the response window on the unread landing page, one or more preceding messages received from the chat and video conference provider via one or more chat channels, wherein the one or more preceding messages are associated with the unread message.

13. The method of claim 12, wherein the one or more preceding messages include one or more read messages.

14. The method of claim 8, further comprising:

receiving an input corresponding to a selection of the jump button associated with an unread message; and in response to receiving the input:

removing, from the unread landing page, the unread message associated with the selection of the jump button;

determining a chat channel associated with the unread message; and displaying the chat channel associated with the unread message.

15. The method of claim 8, further comprising:

providing, via a sidebar, a first unread notification of a first unread message from the one or more unread messages corresponding to a first chat channel of the one or more chat channels; and providing, via the sidebar, a second unread notification of a second unread message from the one or more unread messages corresponding to a second chat channel of the one or more chat channels.

16. A non-transitory computer-readable medium comprising processor-executable instructions configured to cause one or more processors to:

access one or more chat channels, wherein the one or more chat channels are established by a chat and video conference provider;

determine that one or more messages, directed to a user via the one or more chat channels, comprise one or more unread messages;

generate a notification of the one or more unread messages corresponding to the one or more chat channels, wherein the notification includes a numerical value indicating how many unread messages correspond to the one or more chat channels;

generate an unread landing page comprising the one or more unread messages from each of the one or more chat channels, wherein the unread landing page includes a respective lump button corresponding to each unread message of the one or more unread messages, each respective jump button being selectable by the user to display a corresponding chat channel containing the corresponding unread message; and provide, via the unread landing page, a response window associated with an unread message of the one or more unread messages.

17. The non-transitory computer-readable medium of claim 16, wherein the processor-executable instructions are further configured to cause the one or more processors to:

provide, via the unread landing page, the response window associated with an unread message of the one or more unread messages; and transmit, to the chat and video conference provider, a response message corresponding to the unread message via the unread landing page.

18. The non-transitory computer-readable medium of claim 16, wherein the processor-executable instructions are further configured to cause the one or more processors to:

receive an input corresponding to a selection of the jump button associated with an unread message; and in response to receiving the input:

remove, from the unread landing page, the unread message associated with the selection of the jump button;

determine a chat channel associated with the unread message; and display the chat channel associated with the unread message.

19. The non-transitory computer-readable medium of claim 16, wherein the processor-executable instructions are further configured to cause the one or more processors to:

provide, via a sidebar, a first notification of a first unread message from the one or more unread messages corresponding to a first chat channel of the one or more chat channels; and provide, via the sidebar, a second notification of a second unread message from the one or more unread messages corresponding to a second chat channel of the one or more chat channels.

20. The non-transitory computer-readable medium of claim 16, wherein the processor-executable instructions are further configured to cause the one or more processors to:

receive a selection by the user of a plurality of messages from a plurality of chat channels; and generate a combinatory heading associated with the selection in a user interface, the combinatory heading being selectable by the user to view the plurality of messages from the plurality of chat channels in a window of the user interface.

* * * * *